M. B. PEAL.

COMBINED SPINDLE AND CASING FOR MUSIC ROLLS.

APPLICATION FILED NOV. 9, 1918.

Reissued May 18, 1920.

14,860.

Inventor

Marshall B. Peal

By his Attorney

L. Bonford Handley

UNITED STATES PATENT OFFICE.

MARSHALL B. PEAL, OF BROOKLYN, NEW YORK.

COMBINED SPINDLE AND CASING FOR MUSIC-ROLLS.

14,860. Specification of Reissued Letters Patent. Reissued May 18, 1920.

Original No. 1,245,377, dated November 6, 1917, Serial No. 113,599, filed August 7, 1916. Application for reissue filed November 9, 1918. Serial No. 261,912.

*To all whom it may concern:*

Be it known that I, MARSHALL B. PEAL, residing at Brooklyn, in the county of Kings and State of New York, have invented certain new and useful Improvements in Combined Spindles and Casings for Music-Rolls, of which the following is a specification.

This invention relates to a combined spindle and casing for music rolls, and the object thereof is to provide a construction in which the music rolls spindle will constitute in part a portion of the casing.

A further object is to provide means whereby the spindle with the music roll thereon may be withdrawn without necessity for removing a lid of the casing as has been the custom heretofore.

A further object is to provide a spindle of such construction that one of the end members thereof will constitute an end closure for the casing, and to adapt the end member of the spindle to carry the designating title of the music roll.

A further object is to provide a convenient handgrip whereby the spindle may be readily withdrawn from the casing.

A further object is to so shape one or both of the end members of the spindle so that they will have greater surface contact with the adjacent portions of the casing than heretofore.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Figure 1:
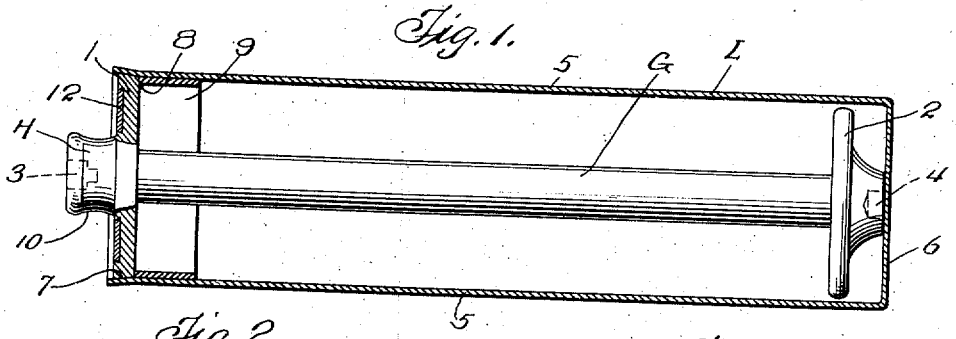
Figure 1 is a longitudinal sectional view taken through device constructed in accordance with the provisions of this invention.

Referring to the drawings for a detailed description of the structure illustrated therein, the reference character L indicates the casing, and the reference character G indicates the spindle. The spindle is provided with opposite end members or "heads" 1 and 2, which heads are of the usual construction common to player piano rolls, except as herein described. One of the heads as 1 is provided with a socket 3, while the other head, as 2, is provided with a socket 4, the sockets 3 and 4 being shaped to receive the appropriate parts of the piano structure for supporting and operating the roll.

Figure 2:
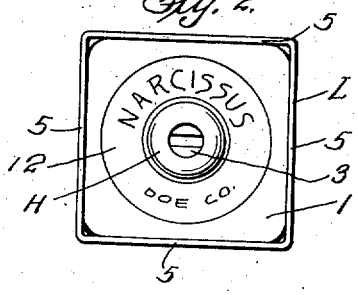
Fig. 2 is an end view of the structure shown in Fig. 1, looking at the left hand end of said figure.
Figure 3:
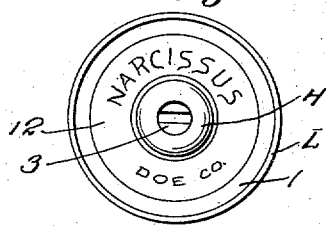
Fig. 3 is a smaller view but illustrating a modified form for the casing.

The casing L may be made rectangular, as indicated in Fig. 2, all of the side walls 5 thereof being rigidly connected and together constitute a rectangular tube permanently closed at one end by an end wall 6. The opposite end is left open, and is adapted to be closed by the head 1 of the spindle. For this purpose the head 1 and the casing are preferably made of such size relatively to each other that the head will fit snugly into the open end of the casing, preferably the marginal edge surface of the head is slightly inclined, as at 7, so as to provide a wedge-like action as the head is forced into the casing. A sufficiently tight connection will thus be provided for preventing accidental displacement of the spindle from within the casing. Of course, the same result may be brought about by having the end walls of the casing slightly tapered, as indicated, if desired, but this is usually not necessary owing to the fact that the resiliency, or flexibility, of the material of the casing will permit the walls to readily accommodate themselves to the taper of the head 1. The inward movement of the spindle may be arrested by an engagement of the head 2 with the end wall 6 of the casing, but preferably a shoulder 8 is provided within the outer end of the casing disposed to be engaged by the inner surface of the head 1 for this purpose. The shoulder 8 is provided for fixing a strip of cardboard, metal, or the like 9 within the casing, as illustrated. The strip 9 will incidentally serve as a reinforcing member for the cardboard of the casing. The modification in Fig. 3 illustrates a casing which is circular in cross section. This form of casing is desirable, as it will avoid necessity for making the head 1 of the rectangular shape shown in Fig. 2.

In order to provide means for conveniently withdrawing the spindle from within the casing a hand grip, or extension H, is provided upon the outer surface of the head 1 shaped to provide a suitable finger-hold. It may have an under-cut portion 10 in some cases.

Socket 3 is formed directly in the extension H.

Figure 4:
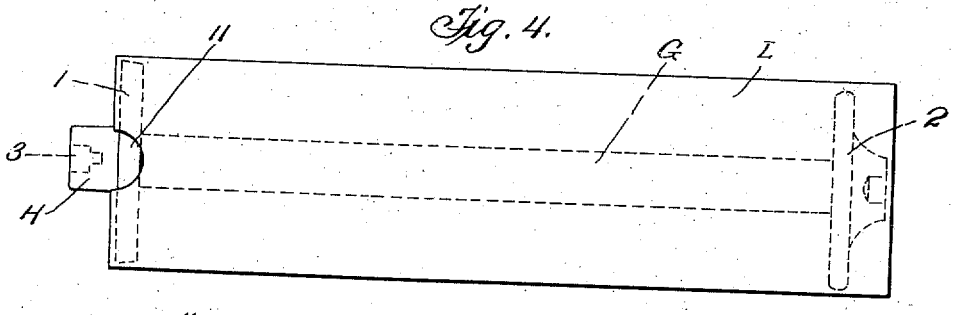
Fig. 4 is a side elevational view of the device illustrating a modification.

In the modification Fig. 4 the casing is shown to have a portion cut out therefrom as at 11, so that a person's finger may be allowed to grip directly upon the edge surface of the head 1. This may be employed either with or without the finger grip extension H shown in the other figures. In all cases, the exterior surface of the head 1 being exposed, said surface is adapted to carry the designating title of the music roll which is wound upon the spindle, but if desired, a shallow annular groove or pocket 12 may be formed within which may be received a printed label ring of paper, or the like 12, bearing the designating title and other printed matter. This groove has one or both of its side walls preferably under-cut as illustrated so that the label may be inserted and removed at will.

Figure 5:
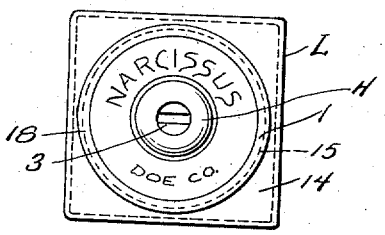
Figs. 5 and 6 are end and sectional views respectively illustrating a further modification.
Figure 6:
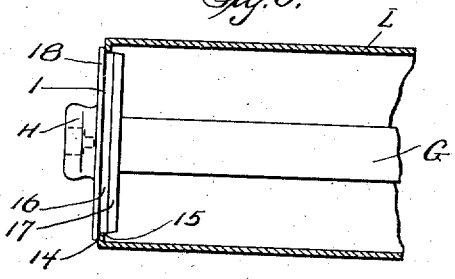

In the modification Figs. 5 and 6 a means is illustrated in which a rectangular casing may be employed in connection with a circular spindle head. In this modification the outer end of the casing is shown to be provided with a wall 14, which is formed with a circular opening 15 therethrough and the head 1 of the spindle is shown as being circular and as being provided with an annular surface 16 to fit snugly within the opening 15. An annular inclined surface 17 is formed upon the head for facilitating movement of the head into the opening 15. An annular flange 18 is provided for engaging against the outer surface of the wall 14.

The frictional engagement between the wall 15 and the surface 16 is sufficient to retain the spindle against accidental detachment.

It is noted that the structure described above and particularly the structure illustrated in Figs. 1, 2 and 3, provides for a great extent of surface engagement of the outer head 1 of the spindle with the adjacent portions of the casing. This engagement provides a very desirable reinforcement for the casing of a nature to prevent crushing of the casing when packed or stored in boxes for shipment or otherwise. The reinforcing strip 9, being situated adjacent to the parts of the casing which are supported by engagement with the flat edge faces of the head, serves as an auxiliary to the head to prevent crushing in this locality.

The polygonal shape of the outer head of the spindle, as clearly seen in Fig. 2, renders the spindle easy to handle after being withdrawn from the box in that it prevents the spindle from rolling from place to place when laid upon a table, or other smooth surface.

It will, of course, be understood that the intermediate part of the spindle G, to which the heads 1 and 2 are connected, may be formed in any approved manner, either as integral parts of the head or otherwise. It may in some cases even be formed by a part of the music roll itself, as is now a common practice.

As many changes could be made in the above described construction without departing from the scope of the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A music roll holder comprising a spindle adapted to receive the music roll wound thereon, a pair of heads carried by the spindle at the opposite ends thereof, an open ended casing in which the spindle and heads are received, one of said heads being of a size and shape to coöperate with the casing to close the open end of the casing, an extension projecting outwardly from the outer surface of said last mentioned head, and said extension being formed to serve the double purpose, first, as a finger grip by means of which to remove the spindle from the casing and, second, as a part to receive a coöperative portion of a player piano mechanism.

2. A music roll holder comprising a spindle adapted to receive the music roll wound thereon, a pair of heads carried by the spindle at the opposite ends thereof, an open ended casing in which the spindle and heads are received, one of said heads being of a size and shape to coöperate with the casing to close the open end of the casing, an extension projecting outwardly from the outer surface of said last mentioned head, said extension being formed to serve the double purpose, first, as a finger grip by means of which to remove the spindle from the casing, and, second, as a part to receive a coöperative portion of a player piano mechanism, said extension being substantially central of said head and said head having an annular outer surface portion surrounding the extension for receiving a label or the like.

3. A music roll holder comprising a spindle adapted to receive the music roll wound thereon, a pair of heads carried by the spindle at the opposite ends thereof, an open ended casing in which the spindle and heads are received, one of said heads being of a size and shape to coöperate with the casing to close the open end of the casing, an extension projecting outwardly from the outer surface of said last mentioned head, said extension being formed to serve the double purpose, first, as a finger grip by means of which to remove the spindle from the casing and, second, as a part to receive a coöperative portion of a player piano mechanism, said head having an annular undercut groove formed in its outer surface surrounding said extension, and a label within said groove detachably retained by the undercut formation of the groove.

4. A music roll holder comprising a spindle adapted to receive the music roll wound thereon, a pair of heads carried by the spindle at the opposite ends thereof, an open ended casing in which the spindle and heads are received, one of said heads being of a size and shape to coöperate with the casing to fit within and close the open end of the casing, and a separately formed strip fixed to the inner surface of the walls of the casing adjacent the open end thereof to serve the double purpose, first, of strengthening and reinforcing said walls, and second, of providing an abutment within the casing against which the inner marginal portions of the last mentioned head of the spindle engage when inserting the spindle within the casing.

5. A music roll holder comprising a spindle adapted to receive the music roll wound thereon, a pair of heads carried by the spindle at the opposite ends thereof, an open ended casing in which the spindle and heads are received, one of said heads being of a size and shape to coöperate with the casing to fit within and close the open end of the casing, an extension formed axially of the spindle at the outer side of said last mentioned head having a certain formation therein to receive a coöperative part of a player piano mechanism, said extension also being of a character to constitute a finger grip by means of which to remove the spindle from the casing, and a portion of the casing at the open end thereof being formed to give finger access to a marginal portion of the mentioned head of the spindle.

6. A music roll holder comprising a spindle adapted to receive the music roll wound thereon, a pair of heads carried by the spindle at the opposite ends thereof, an open-ended casing in which the spindle and heads are received, one of said heads being of a size and shape to coöperate with the casing to fit within and close the open end of the casing, said last mentioned head having a certain formation therein to receive a coöperative part of a player piano mechanism, a portion of the casing at the open end thereof being formed to give finger hold to a marginal portion of the mentioned head, and said last mentioned head having a portion providing a second finger hold in opposition to the first finger hold, whereby the two finger holds coöperate to provide means whereby the mentioned head may be gripped to remove the spindle from the casing.

7. A music roll holder comprising a spindle, having a polygonal end flange, a container within which said spindle is adapted to fit, and said container being of square cross section thereby providing substantial areas of contact between said end flange and the interior of the container.

8. A music roll holder comprising a spindle, a container within which said spindle is adapted to fit, said container being of rectangular cross section, and said spindle including an end flange formed with substantially flat edge surfaces, thereby providing substantial areas of contact between said end flange and the interior of the container.

9. A music roll holder comprising a spindle, a container within which said spindle is adapted to fit, said container being of rectangular cross section, said spindle having a polygonal end flange providing substantial areas of contact between said end flange and the interior of the container, and a reinforcing member carried by the container adjacent to the portion of the container with which said end flange engages.

10. A music roll holder comprising a spindle having opposite end flanges, an open-ended container within which the spindle is adapted to fit, and said container and one of said flanges being of such relative size and shape that said mentioned flange will fit into the open end of the container in frictional engagement with the inner surface of the walls of the container to thereby form a removable closure for said open end.

In testimony whereof I affix my signature in the presence of two witnesses.

MARSHALL B. PEAL.

Witnesses:
L. Gessford Handy,
May Schulz.